United States Patent Office 3,231,549
Patented Jan. 25, 1966

3,231,549
POLYMERISATION OF OLEFINES CONTAINING THE VINYL GROUP
John Brewster Rose, St. Albans, England, assignor to Imperial Chemical Industries Limited, London, England, a corporation of Great Britain
No Drawing. Filed Mar. 28, 1960, Ser. No. 17,784
Claims priority, application Great Britain, Mar. 27, 1957, 9,985/57
3 Claims. (Cl. 260—88.2)

This application is a continuation-in-part application of our copending application Serial No. 720,093, filed March 10, 1958, now abandoned.

This invention relates to the polymerisation of olefines containing the vinyl group and to catalysts therefor. More particularly it refers to the polymerisation of ethylene, propylene, and dienes such as butadiene and isoprene.

The object of this invention is to provide catalysts for the polymerisation of ethylene in good yields. A further object is to provide a process for the polymerisation of ethylene leading to polyethylenes of high density, high tensile strength and high crystalline melting point. A still further object is to provide preferred catalysts which will polymerise propylene to isotactic polypropylene. A yet further object is to provide catalysts which will polymerise dienes such as butadiene and isoprene. Other objects, features and advantages will be apparent from the following description of our invention.

According to French specification No. 1,132,506 (Farbenfabriken Bayer A.G.) olefines may be polymerised in an anhydrous medium using activated titanium metal or titanium compounds in which the valency of the titanium compound is below 3, particularly titanium dihalides, and these catalysts may be constituted by titanium metal having titanium halides, particularly the dihalides and trihalides adsorbed to or forming the surface layer of the catalysts. Furthermore, according to the French specification, aluminium halides may be used in conjunction with the above catalysts; but it is stated that they should not be used in amounts greater than about 10% by weight of the titanium catalysts if high molecular weight solid polymers are required.

We have now found, unexpectedly, that if an activated titanium compound prepared by pyrolysis in which the apparent valency of the titanium is less than 2 as hereinafter specified, and which has been subjected to attrition by grinding, is used to polymerise ethylene in the presence of a definite amount, greater than 10% by weight of the said titanium metal or titanium compound, of an aluminium halide, very active catalysts of ethylene polymerisation ensues giving greater yields and reaction rates compared with that according to the said French specification and the product is of high density, higher tensile strength than in the said French specification, and of high crystalline melting point. The amount of aluminium halide utilised is generally from about 50% to about 500% by weight of the titanium compound. (The specific amount used, however, is related to the amount of hydrocarbon polymerisation medium rather than to the amount of titanium halide compound.)

Further, our preferred catalysts, as specified hereinafter, will polymerise propylene to give isotactic polypropylene.

The present invention provides a process for the polymerisation of olefines containing the vinyl group in which at least one such olefine is brought into contact with a reaction medium consisting essentially of a hydrocarbon liquid and a catalyst composition containing (a) the pyrolysis product of titanium dichloride, trichloride, dibromide or tribromide, said product having a halogen to titanium atomic ratio in the range of 1.5:1 to 1.95:1 which has been subjected to attrition by grinding; and (b) aluminium chloride or bromide in an amount in the range $1.54 \times 10^{-3}$ to $1.25 \times 10^{-2}$ moles of aluminium chloride or bromide per litre of the said hydrocarbon liquid. The effectiveness of the catalyst composition may be due to the presence of an unidentified titanium halide complex. The amount of aluminium chloride or bromide referred to is the amount used up in the making of the catalyst composition.

A preferred type of catalyst composition component (a) is prepared by pyrolysing a titanium trihalide, e.g. titanium trichloride at a temperature of at least 550° C. for at least 5 hours when a titanium tetrahalide is evolved and removed, e.g. in a stream of inert gas or by vacuum extraction. Component (a) may similarly be produced by pyrolysing $TiCl_2$ or $TiBr_2$. Very satisfactory results are obtained when the halide is a chloride. A reaction medium containing this preferred catalyst will polymerise propylene to isotactic polypropylene. Our preferred aluminium halide is the bromide as this can readily be used as a solution in a hydrocarbon liquid and gives the best yields.

To obtain maximum yields it is preferred that with these components prepared by pyrolysing a titanium halide, the aluminium halide is aluminium bromide employed in an amount in the range 0.75 to 1.5 grams ($2.81 \times 10^{-3}$ to $5.62 \times 10^{-3}$ moles) per litre of hydrocarbon liquid. A convenient method for producing the catalyst composition is to grind the component (a) to a fine powder, preferably in a hydrocarbon liquid and then to mix it with the aluminium halide component (b). Components (a) and (b) may, however, be ground together in a hydrocarbon liquid to form the catalyst composition directly.

A further method of obtaining the reaction medium is to (i) grind the said product prepared by pyrolysing $TiCl_3$ or $TiCl_2$ and bring it into contact with a solution of aluminium bromide in a hydrocarbon liquid, the said bringing into contact being carried out during or after the grinding as desired (ii) separate, e.g. by decantation, the solid from most of the remaining liquid and (iii) re-suspend the solid in further hydrocarbon liquid; the amount of aluminium bromide used being in an amount of at least 0.75 grams ($2.81 \times 10^{-3}$ moles), and if desired more than 3.33 grams ($1.25 \times 10^{-2}$ moles) per litre of hydrocarbon liquid finally present in the reaction medium. This further method is useful since it minimises the amount of aluminium halide present in the polymerisation process and thus in the polymer produced. Also in the polymerisation of propylene this method reduces the amount of oily or greasy liquid as opposed to solid polymer obtained.

A catalytic medium may also be prepared by grinding titanium metal in a solution or dispersion of aluminium chloride, bromide or iodide in a hydrocarbon liquid. The yields of polymer obtained are however relatively poor compared with those obtained using the said component (a) prepared by pyrolysis as may be seen on comparing Example 1 and Table I with the examples using the pyrolysis product. This catalytic material prepared using titanium metal also has the disadvantage that it imparts a grey to black colour to the polymer produced and this is difficult to remove. The said catalyst component (a) prepared by the pyrolysing of a titanium halide however can be extracted from polymers prepared using it by washing with an alcohol e.g. dry methanol preferably after macerating with the alcohol. This treatment may also be used to extract the aluminium halide from the polymers.

It has been found that the aluminium iodide and titanium iodides lead to poor yields and are expensive and are therefore excluded from our invention.

Steel ball mills are particularly suitable for the grinding operation. Hydrocarbon liquids used in the process of this invention should be free from sulphur containing impurities as the most active catalysts are thereby obtained, aliphatic hydrocarbon liquids being particularly preferred.

We find that the concentration of aluminium also present in the reaction medium affects the yield of ethylene polymer produced by our process and also the molecular weight (as indicated by melt viscosity at 197° C.) of the polymer. To obtain optimum yields and polymers of molecular weight well suited for use in standard injection moulding and extrusion equipment, we find that the best results are obtained when aluminium bromide is used in the preferred concentration of between 0.75 and 1.5 grams ($2.81 \times 10^{-3}$ to $5.62 \times 10^{-3}$ moles) per litre of hydrocarbon reaction medium. Another variable relevant to the molecular weight of the polymers is the amount of titanium catalyst present in the reaction mixture.

Good yields of ethylene polymers are obtained easily by the process of this invention at low pressures such as from 1 to 100 atmospheres, and at moderate temperatures such as between 0 and 250° C., particularly 50 to 150° C.

According to this invention propylene, mixtures of propylene and ethylene, butene-1, pentene-1, styrene, butadiene, isoprene and other dienes having a vinyl group, or mixtures of these various monomers may be polymerised as well as ethylene. They are particularly readily polymerised under the conditions recommended for ethylene above. It is to be understood, however, that the process of this invention could be carried out at pressures below 1 atmosphere and above 100 atmospheres, and at temperatures above 250° C.

The catalysts of this invention are attacked by oxygen, carbon dioxide and moisture and their preparation and use as catalysts for polymerising ethylene should therefore be conducted in the absence of air or moisture or in the presence of only limited controlled amounts of these.

We find that the process of this invention is well suited to the production of high melting, high density, strong polymers of ethylene.

The following examples serve to illustrate this invention.

EXAMPLE 1

8 gm. powdered titanium, 2 gm. aluminium bromide and 100 ml. 100–120° C. petroleum ether free from aromatic constituents and sulphur were ball milled together for 15 hours in a steel ball mill in which air had been replaced by nitrogen. The slurry obtained was transferred to an autoclave under nitrogen and a further 500 ml. petroleum ether added. The autoclave was sealed and ethylene was passed in until the pressure was 40 atmospheres at room temperature. The autoclave was heated to 90° C. for 15 hours, the maximum pressure reached being about 60 atmospheres. The solid product was macerated with methyl alcohol and then washed with methyl alcohol. 97 gm. of polyethylene were obtained. In this product there was about 10% low molecular weight polymer which was removed by hot extraction with petroleum ether: the melt viscosity of the extracted product was $1 \times 10^7$ poises at 197° C.

EXAMPLE 2

67 gm. of $TiCl_3$ were heated to 700° C. in a stream of argon for 16 hours. The product weighed 28 gm. and showed an empirical formula $TiCl_{1.82}$. 2 gm. of this product were ball milled with 1 gm. aluminium bromide dissolved in 500 ml. purified petroleum ether. The ball milling was carried out in a stainless steel mill. The petroleum ether used was an aromatic free grade, B.P. 100–120° C., and had been further purified by refluxing with an alloy of sodium and potassium and distilling from the alloy in an atmosphere of argon.

The catalyst obtained by this ball milling was transferred in an inert atmosphere to a stirred autoclave and ethylene passed into the autoclave at 50 atmospheres pressure. Polymerisation commenced immediately and the temperature in the autoclave rose rapidly to 90° C. The autoclave was maintained at 90° C. and the ethylene pressure at 50 atmospheres for 15 hours. The polymer produced was washed with methanol and dried to give 180 gm. polyethylene of melt viscosity at 197° C. of $1.72 \times 10^5$ poises.

EXAMPLE 3

The procedure of Example 1 was repeated using 3 gm. of $TiCl_{1.82}$ and polymerising the ethylene at 20° C. and 1 atmosphere pressure for two hours. After washing with methanol, 25 gm. of polyethylene of melt viscosity at 197° C. of $6.1 \times 10^7$ poises were obtained.

EXAMPLE 4

A catalyst prepared as described in Example 1 but using 3 gm. of $TiCl_{1.82}$ was transferred in an inert atmosphere to a stirred autoclave and ethylene was passed into the autoclave at 10 atmospheres. Polymerisation started immediately and the temperature rose to 40° C. 200 ml. propylene were then injected into the autoclave which was heated to 90° C. for 16 hours. 63 gm. of a rubbery solid were produced which was extracted with warm 60–80 petroleum ether. The soluble extract was precipitated by the addition of ethanol and was shown by its infra-red spectrum to be a copolymer of 60% propylene with 40% ethylene. The residue was largely crystalline polyethylene.

EXAMPLE 5

$TiCl_3$ was heated to 750° C. in a stream of argon for 16 hours. A composition showing the empirical formula $TiCl_{1.65}$ was obtained. 3 gm. of this composition were treated as described in Example 1 and the catalyst transferred in an inert atmosphere to a stirred autoclave. Ethylene was passed into the autoclave at 50 atmospheres pressure. The polymerisation reaction was then conducted as described in Example 1 and 222 gm. of polyethylene of melt viscosity at 197° C. of $1.28 \times 10^7$ poises were obtained.

EXAMPLE 6

Table II below illustrates the effects of pyrolysing $TiCl_3$ under various conditions. 1.1 gm. of Sample 1 of that table, 0.6 gm. of aluminium bromide and 100 ml. of petroleum ether free from sulphur-containing impurities were transferred to a steel ball mill under an inert atmosphere. The mill was sealed and rotated for 20 hours. The slurry obtained was washed into a 2-litre autoclave, still under an inert atmosphere, with a further 500 ml. of the same petroleum ether. 200 ml. of liquid propylene were injected into the autoclave from a pressure burette. The autoclave was held at 90° C. for 2 hours, after which the solid polymer obtained was washed with methanolic hydrofluoric acid and then with methanol. 2.5 gm. of crystalline polypropylene, shown to be isotactic by infra-red examination, was obtained. 16% of this solid polymer was soluble in ether when subjected to Soxhlet extraction over a period of 48 hours.

Our invention is further illustrated, but not limited, by the following Tables I, II, III, IV, V, VI, VII and VIII.

Table I shows the effect of various aluminium halides with titanium metal on the polymerisation of ethylene. In the experiments of this table, the finely divided titanium was ball-milled under anaerobic conditions with a solution or dispersion of the halide in 100 ml. dry oxygen free petroleum ether (B.P. 100–120° C.) for 90 hours in a stainless steel ball mill. The slurry obtained was transferred under nitrogen to an autoclave, in which it was stirred with ethylene (99.9% pure) under the conditions specified in Table I. The solid polymer obtained was isolated by the method described in Example 1. The table shows that $AlBr_3$ is more effective under these conditions of reaction with titanium than the other aluminium halides.

Table I

| Polymerisation | Catalyst Components | Polymerisation Details | | Yield of solid polymer, gm. |
|---|---|---|---|---|
| | | Temp.,° | Maximum pressure, p.s.i. | |
| 7 | 2 gm. Ti+1.0 gm. AlBr₃ | 90 | 500 | 162 |
| 8 | 2 gm. Ti+1.0 gm. AlCl₃ | 200 | 1,000 | 4.5 |
| 9 | 2 gm. Ti+1.0 gm. AlI₃ | 200 | 1,000 | 40 |

Table II illustrates effects of pyrolysing $TiCl_3$. These pyrolyses were conducted in a silica flask from which $TiCl_4$ evolved was removed, in method (a) by blowing a slow stream of argon through the flask and, in method (b), by pumping it out by means of a vacuum pump. Pyrolysing conditions and the composition of the materials produced are shown in the table.

Table II

| Material Sample | Method of TiCl₄ Removal | Heat Treatment | | Composition of the material | | |
|---|---|---|---|---|---|---|
| | | Max. Temp., Degrees | Time of Heating, hrs. | Percent Ti | Percent Cl | Cl:Ti Ratio |
| 1 | (a) | 695 | 32 | 42.3 | 54.4 | 1.74 |
| 2 | (b) | 480 | 4 | 36.5 | 63.0 | 2.34 |
| 3 | (b) | 475 | 6 | 38.0 | 59.6 | 2.12 |
| 4 | (b) | 480 | 6 | 39.1 | 59.2 | 2.05 |
| 5 | (b) | 480 | 21 | 39.6 | 59.2 | 2.02 |
| 6 | (b) | 475 | 24 | 40.0 | 57.0 | 1.93 |
| 7 | (b) | 475 / 550 | 18 / 5 | 40.9 | 57.7 | 1.91 |
| 8 | (b) | 550 | 40 | 43.4 | 53.6 | 1.67 |
| 9 | (b) | 575 | 42 | 43.7 | 53.8 | 1.66 |
| 10 | (b) | 450 / 700 | 18 / 24 | 49.3 | | 1.39 |

With regard to Sample 4 of Table II, it is believed that the material was not pyrolysed to a uniform extent as some of it collected round the neck of the flask during the pyrolysis and subsequently fell back into the bulk of the material. It is therefore believed this sample of material contained $TiCl_3$ with material of Cl:Ti atomic ratio of less than 2.

Samples of the materials of Table II and of $AlBr_3$ as specified in Tables III, IV, V, VI and VII were weighed out from storage tubes using dispensing equipment which allowed them to be transferred to the ball-mill under an inert atmosphere (nitrogen or argon). The ball-mill, which was made entirely of stainless steel, had previously been purged of all air. Hydrocarbon liquid (100 ml.) was added, the mill sealed, and then rotated by means of revolving roller for 20 hours. The hydrocarbon liquid used was petroleum ether (B.P. 100–120° C.) that had been purified by being refluxed in a nitrogen atmosphere over an alloy of sodium and potassium. It was stored under nitrogen. The milled product was then diluted to a total volume of 1 litre with further hydrocarbon liquid and charged to a stirred autoclave, great care being taken to exclude air. After the catalyst had been added, the autoclave was sealed and ethylene passed in until a pressure of 300 p.s.i. (at 20°) was obtained. If polymerisation did not occur immediately the autoclave was heated, but if a rapid polymerisation took place cooling was required. The heating and/or cooling was adjusted so that a temperature of 90° was maintained. If the pressure in the autoclave dropped below 350 p.s.i. then more ethylene was passed in. After 2 hours the autoclave was cooled and unreacted monomer vented. The polymer was washed thoroughly with methanol and dried in a vacuum oven. In Tables III, IV, V, VI and VII below the yield of polymer is expressed as gm. of polymer obtained per gm. of titanium component used and the melt viscosity of the polymer is in poises at 197°.

Table III

| Polymerisation | Pyrolysis Product | | | Wt. AlBr₃ used | Polymer | |
|---|---|---|---|---|---|---|
| | Sample | Cl:Ti Ratio | Wt. used gm. | | Yield | Melt Viscosity |
| 10 | TiCl₃ | 3 | 0.872 | 1.078 | 3 | 1.73×10⁵ |
| 11 | 2 | 2.34 | 0.724 | 1.032 | 65 | 1.89×10⁵ |
| 12 | 3 | 2.12 | 0.797 | 1.005 | 11 | <10⁴ |
| 13 | 4 | 2.05 | 0.746 | 0.009 | 245 | 5.4×10⁴ |
| 14 | 4 | 2.05 | 0.344 | 0.012 | 352 | 6.55×10⁴ |
| 15 | 5 | 2.02 | 0.741 | 1.037 | 89 | 4.0×10⁴ |
| 16 | 6 | 1.93 | 0.801 | 0.994 | 209 | |
| 17 | 7 | 1.91 | 0.308 | 1.054 | 633 | 5.35×10⁴ |
| 18 | 7 | 1.91 | 0.290 | 1.010 | 600 | 8.95×10⁴ |
| 19 | 8 | 1.67 | 0.390 | 1.040 | 646 | 8.25×10⁴ |
| 20 | 8 | 1.67 | 0.300 | 1.180 | 787 | 5.15×10⁴ |
| 21 | 8 | 1.67 | 0.190 | 1.050 | 1,360 | <10⁴ |
| 22 | 9 | 1.66 | 0.318 | 0.991 | 569 | 2.5×10⁵ |
| 23 | 10 | 1.39 | 1.018 | 0.986 | 195 | |
| 24 | 10 | 1.39 | 0.459 | 1.031 | 388 | |

Table IV

| Polymerisation | Catalyst | | Polymer | |
|---|---|---|---|---|
| | Wt. of Material 1 of Table II gm. | Wt. AlBr₃ gm. | Yield | Melt Viscosity |
| 25 | 0.78 | 0.00 | 52 | 5.05×10⁸ |
| 26 | 0.74 | 0.24 | 42 | 1.44×10⁸ |
| 27 | 0.78 | 0.41 | 104 | 2.45×10⁷ |
| 28 | 0.77 | 0.81 | 270 | 1.73×10⁷ |
| 29 | 0.74 | 0.99 | 284 | 2.3 ×10⁶ |
| 30 | 0.73 | *1.06 | 283 | 1.73×10⁵ |
| 31 | 0.75 | 1.47 | 260 | 1.27×10⁵ |
| 32 | 0.75 | 2.99 | 151 | 5.25×10⁵ |
| 33 | 0.74 | 6.00 | 15 | 3.2 ×10⁶ |

In the experiment marked *, the pyrolysis product was ball-milled by itself and then AlBr₃ was added as the ball-milled product was charged to the autoclave.

Table V

| Polymerisation | Catalyst | | Polymer | |
|---|---|---|---|---|
| | Wt. of Material 9 of Table II gm. | Wt. AlBr₃ gm. | Yield | Melt Viscosity |
| 34 | 0.78 | 0.00 | 75 | 2.4 ×10⁸ |
| 35 | 0.43 | 0.00 | 45 | 4.05×10⁸ |
| 36 | 0.301 | 0.274 | 20 | 4.25×10⁶ |
| 37 | 0.306 | 0.511 | 134 | 1.25×10⁵ |
| 38 | 0.299 | 0.780 | 555 | >10⁴ |
| 39 | 0.318 | 0.991 | 569 | 2.5 ×10⁵ |
| 40 | 0.300 | 1.258 | 489 | 2.72×10⁵ |
| 41 | 0.333 | 1.49 | 250 | 6.2 ×10⁵ |
| 42 | 0.314 | 3.11 | 76 | 3.55×10⁶ |

Table VI

| Polymerisation | Catalyst | | Polymer | |
|---|---|---|---|---|
| | Wt. of Material 7 of Table II gm. | Wt. AlBr₃ gm. | Yield | Melt Viscosity |
| 43 | 0.298 | 0.994 | 537 | 1.15×10⁵ |
| 44 | 0.344 | 1.001 | 358 | 1.0×10⁵ |
| 45 | 0.299 | 3.117 | 64 | 1.03×10⁶ |
| 46 | 0.319 | 3.121 | 370 | <10⁴ |

Polymerisations in the above Table VI were carried out as previously described except Polymerisations 44 and 46. In these polymerisations the product obtained by ball-milling was diluted with 0.5 litre of solvent, and then allowed to stand until the solid component had settled out. Then most of the liquid phase, which contained dissolved $AlBr_3$, was drawn off and rejected. The solid remaining was then redispersed in 1 litre of solvent and used to catalyse ethylene polymerisations as previously described. In all the above operations air was rigorously excluded.

Table VII

| Polymerization | Catalyst | | | Polymer | |
|---|---|---|---|---|---|
| | Wt. of Material 9 of Table II gm. | Halide | Weight halide gm. | Yield | Melt Viscosity |
| 47 | 0.43 | None | None | 45 | $4.05 \times 10^8$ |
| 48 | 0.294 | $AlCl_3$ | 0.512 | 110 | $1.6 \times 10^6$ |
| 49 | 0.308 | $AlCl_3$ | 0.793 | 140 | $<10^4$ |
| 50 | 0.318 | $AlBr_3$ | 0.991 | 569 | $2.5 \times 10^5$ |
| 51 | 0.411 | $AlI_3$ | 1.663 | 83 | $2.95 \times 10^7$ |

Details of polymers produced by our process are shown in Table VIII.

Table VIII

| Polymer of Polymerization | Specific Gravity ᵃ at 20° C. | Crystallite Melting Point ° C. | Yield Stress ᵇ p.s.i. | | Melt Flow Index ASTM Test |
|---|---|---|---|---|---|
| | | | at 25° C. | at 100° C. | |
| 19 | 0.957 | 127–135 | 5,000 | 1,200 | 1 |
| 29 | 0.953 | 127–132 | 4,500 | 1,300 | 0.2 |
| 30 | 0.958 | 127–132 | 5,000 | 1,300 | 0.5 |

ᵃ Specific gravity was measured on samples cooled from just below their melting points at 0.3° C./min.
ᵇ Stress was applied in measuring yield stress at 37% per second.

As hereinbefore set out the products obtained according to this invention are generally white and they are characterised by their linear structure. In the case of polythenes they are particularly characterized by their high densities, high crystallinity and high crystalline melting point.

The ethylene polymers obtained in accordance with this invention are highly valuable in numerous applications, especially in the form of films, moulded articles, fibres, extruded insulation on wire, etc. The ethylene polymers of this invention are particularly valuable in their application to the production of films and fibres, which when oriented have high tensile strengths.

It is to be observed that the foregoing examples are illustrative only and that numerous embodiments of the invention will occur to those who are skilled in the art.

I claim:

1. A process for the polymerisation of olefines containing the vinyl group selected from the group consisting of ethylene, propylene and mixtures thereof which consists essentially of bringing said olefine, at a temperature in the range 0° C. to 250° C. and at a pressure not less than one atmosphere, into contact with a reaction medium consisting essentially of an inert hydrocarbon liquid and a catalyst composition containing (a) the pyrolysis product of a titanium halide selected from the group consisting of the dichloride, trichloride, dibromide and tribromide, said product having a halogen to titanium atomic ratio between 1.5:1 and 1.95:1 which has been subjected to attrition by grinding and (b) aluminum bromide in an amount between $1.54 \times 10^{-3}$ and $1.25 \times 10^{-2}$ moles of bromide per litre of said hydrocarbon liquid.

2. A process according to claim 1 in which the aluminium bromide is used in an amount between $2.81 \times 10^{-3}$ and $5.62 \times 10^{-3}$ moles per litre of said hydrocarbon liquid and the pyrolysis product is a titanium chloride.

3. A process for the polymerisation of at least one monomer selected from the group consisting of ethylene, propylene and mixtures thereof which comprises bringing said monomer at a temperature in the range 0° C. to 250° C. at a pressure of not less than one atmosphere, into contact with a reaction medium consisting essentially of an inert hydrocarbon liquid and a catalyst composition obtained by grinding the pyrolysis product of a titanium chloride selected from the group consisting of the dichloride and trichloride, said product having a chlorine to titanium atomic ratio between 1.5:1 and 1.95:1 and bringing it into contact with a solution of aluminium bromide in a hydrocarbon liquid; separating the solid for most of the remaining liquid and suspending the product in further hydrocarbon liquid to form said reaction medium; in which the aluminium bromide is used in an amount of at least $2.81 \times 10^{-3}$ moles per litre of said first mentioned hydrocarbon liquid.

References Cited by the Examiner

UNITED STATES PATENTS

| 2,893,984 | 7/1959 | Seelbach et al. | 260—94.9 |
| 2,899,416 | 8/1959 | Schreyer | 260—94.9 |
| 2,965,630 | 12/1960 | D'Alelio | 260—94.9 |
| 3,121,063 | 2/1964 | Tornqvist | 252—429 |

FOREIGN PATENTS

| 216,664 | 5/1957 | Australia. |
| 1,132,506 | 11/1956 | France. |
| 757,873 | 9/1956 | Great Britain. |
| 816,586 | 7/1959 | Great Britain. |

OTHER REFERENCES

"Comp. Treatise Inorg. and Theo. Chem." (Mellor), publ. by Longmans and Company (New York), 1927, vol. 7, page 74.

JOSEPH L. SCHOFER, Primary Examiner.

LESLIE H. GASTON, MORRIS LIEBMAN, JOSEPH R. LIBERMAN, WILLIAM H. SHORT, Examiners.

W. J. VAN BALEN, E. L. ROBERTS, F. L. DENSON, Assistant Examiners.